United States Patent [19]

Brioni et al.

[11] Patent Number: 5,437,845
[45] Date of Patent: Aug. 1, 1995

[54] APPARATUS FOR ACTIVATING CARBON-CONTAINING MATERIAL

[75] Inventors: Osvaldo Brioni, Solza; Dario Buizza, Ospitaletto, both of Italy

[73] Assignee: O.E.T. Calusco S.r.l., Milan, Italy

[21] Appl. No.: 262,706

[22] Filed: Jun. 20, 1994

[30] Foreign Application Priority Data

Jun. 22, 1993 [IT]  Italy .............. MI93A001346

[51] Int. Cl.$^6$ .............................. F28D 11/02
[52] U.S. Cl. ................... 422/198; 422/151; 422/154; 422/209; 422/307
[58] Field of Search .......... 422/198, 209, 210, 307, 422/308, 151, 154; 198/608, 658, 952

[56] References Cited

U.S. PATENT DOCUMENTS

| | | | |
|---|---|---|---|
| 612,181 | 10/1808 | Spurrier | 198/658 X |
| 813,022 | 2/1906 | Queneau | 198/608 X |
| 1,769,412 | 7/1930 | Bernhard | 198/658 X |
| 2,020,506 | 11/1935 | Jewett | 422/209 X |
| 2,255,539 | 9/1941 | Clarkson | 422/209 |
| 2,560,316 | 7/1951 | Walker | 422/209 X |
| 2,600,871 | 6/1952 | Helwig | 422/209 |
| 2,787,599 | 4/1957 | Belden | 422/209 X |
| 3,871,829 | 3/1975 | Keith et al. | 422/209 X |
| 4,125,437 | 11/1976 | Bacon | 198/658 X |

FOREIGN PATENT DOCUMENTS 0245708  11/1987  Germany .................. 198/658

*Primary Examiner*—Timothy M. McMahon
*Attorney, Agent, or Firm*—Guido Modiano; Albert Josif

[57] ABSTRACT

The apparatus for activating carbon-containing material has an inlet for feeding carbon-containing material into a drum-shaped reactor, which is arranged so that its axis is substantially horizontal and has a cylindrical helix for moving the material about and along its axis. Heating burners are arranged outside the drum-shaped reactor and ducts are provided for introducing a stream of superheated steam inside the drum-shaped reactor. There are also discharge ports for discharging the activated carbon-containing material outside the drum-shaped reactor.

17 Claims, 3 Drawing Sheets

APPARATUS FOR ACTIVATING CARBON-CONTAINING MATERIAL

BACKGROUND OF THE INVENTION

The present invention relates to a process and an apparatus for activating carbon-containing material.

1. Field of the Invention

In recent years, activated charcoal, due to its properties as an adsorbent material with inert characteristics, has been used increasingly in the most disparate fields, such as for example:

- in the processing of potable, process and waste water, where activated charcoal effectively removes odors and tastes as well as residues of colors and dissolved organic substances;
- in the purification of air and gases, such as for example in conditioning systems, in sewage systems, and in chemical processes;
- in the preparation of filters for masks, hoods, cigarettes, etc.;
- in the food industry, in processes for the decolorization of sugar, glucose, vegetable oils, fermenting alcoholic beverages, juices, etc.;
- in the pharmaceutical industry, to purify raw materials and intermediate compounds;
- in the chemical industry, to purify colors and plasticizers, organic acids, for galvanic deposition baths, in recovering gold from residues of mining processes, in catalysis, both as a medium (hydrogenation, desulfurization, vinyl chloride synthesis) and as an actual catalyst (phosgene, vinyl acetate, etc.);
- for use as a medicine, on its own or in association with antiseptics, digestive ferments, etc., in the preparation of tablets or capsules.

Its many uses, combined with the increasingly strict limits set by new statutory provisions in the field of pollution, have caused a considerable increase in the use of activated charcoal. One should also add that processing with activated charcoal is often cheaper than other purifying systems, such as thermal or catalytic reheating, scrubbing, or other adsorption techniques, when the level of the impurities is less than a few hundred parts per million.

2. Description of the Related Art

Activated charcoal is obtained by activating carbon-based material derived essentially from bituminous coals, peat, coconut shells, wood, sawdust, etc. by means of activation processes which are designated as chemical or physical.

Chemical activation uses the particular action of some inorganic compounds (activating agents) during the carbonization step, which is performed at temperatures of 400° to 600° C. The material is initially impregnated with appropriate chemicals which, when heated, release oxidizing gases that degrade the organic molecules. The main known activating agents are zinc chloride and phosphoric acid; positive results have been obtained by using sulfates or phosphates of alkaline metals, potassium thiocyanide, and manganese sulfide. Chemical activation is about to be abandoned since the step for the removal of the activating agent entails considerable ecological problems.

Physical or thermal activation is performed with gaseous activating agents that selectively oxidize the carbon-containing material. The treatment, which is usually preceded by carbonization of the raw material so as to reduce its content of volatile substances, uses air, water vapor or carbon dioxide. During the activation step, part of the carbon is burned, consequently increasing porosity.

Oxidation with air is performed at low temperatures, but the exothermic nature of the reaction entails difficulty in managing it; it is used to produce charcoals having a low level of activity. Conversely, since treatment with $CO_2$ or $H_2O$ is endothermic, it is easy to control and thus more widely used despite its high process temperatures.

Presently, activated charcoal is almost entirely produced with the thermal process, using water vapor as a reagent. Thermal activation is performed in reactors normally used in gas-solid reactions in the chemical industry in general. Among these reactors, those currently most used are multiple-hearth furnaces, tubular rotary furnaces and fluid-bed furnaces.

Multiple-hearth furnaces are those most widely used to activate charcoal and are constituted by a metal tower which is internally lined with refractory material and in which various tables are arranged. A shaft rotates at the vertical axis of the tower and has rotating arms fixed thereto; said arms have inclined vanes which have the purpose of moving the material. The charcoal, which is loaded from above, encounters the steam, which is supplied from the lower part, and falls through holes onto the underlying tables since it is moved by the vanes. These reactors have the advantage of well-established technology and high reliability, but they have several problems, including poor efficiency in reaction, which is linked to the particular type of contact between the phases occurring in this reaction. Very poor contact leads to long permanence times, with consequent large volumes and low specific productivity. Furthermore, apparatuses using multiple-table furnaces are very large and complex and therefore require large investments and onerous maintenance operations.

Rotary tubular reactors are instead essentially constituted by a rotating cylinder, at the ends whereof the charcoal and the steam are loaded in countercurrent. These apparatuses are simple but have the drawback that they do not provide good contact between the reagents, and this leads most of all to low productivity.

Fluid-bed furnaces have been adapted to this production in recent years. These furnaces are internally lined with refractory material, and a porous plate is arranged in the lower portion of the furnace; the charcoal is fed onto said plate and the steam passes therethrough. The bed, during agitation, practically doubles its height, providing excellent contact between the phases. This type of apparatus offers, among its many advantages, considerable temperature uniformity, highly effective gas-solid exchange and therefore low permanence times and considerable potential. On the other hand, the fluid bed has, among its disadvantages, the fact that it fragments the product, that it creates considerable erosion problems inside the reactor, and that it furthermore requires high investment costs.

In addition to the above listed specific disadvantages, these known types of apparatus for the thermal activation of charcoal have the drawback of working by direct heat exchange. The hot fumes that must sustain the endothermic nature of the reaction in fact strike the charcoal directly. Excellent heat exchange is obtained in this manner, but on the other hand there is the problem of high specific consumption of charcoal, due to its partial combustion with any excess oxygen contained in the hot fumes. Furthermore, there is a considerable expenditure of energy, since it is necessary to have a reheat unit downstream of the furnace, where the process gases must be treated in order to provide the environmental protection conditions required by applicable statutory provisions.

SUMMARY OF THE INVENTION

The aim of the present invention is to solve the problems described above with reference to known types of apparatus and process for the thermal activation of charcoal by providing a process and an apparatus for activating carbon-containing materials that is highly productive with low investment costs.

Within the scope of this aim, an object of the invention is to provide an apparatus that ensures excellent steam-charcoal contact with consequent high reaction efficiencies.

Another object of the present invention is to provide an apparatus that entails a reduced consumption of charcoal, with respect to conventional apparatuses, during the activation reaction.

Another object of the invention is to provide an apparatus for activating carbon-containing materials that has considerably lower running costs than known apparatuses.

Another object of the invention is to provide an apparatus which is structurally simple, dimensionally compact, and very simple in operation.

Another object of the invention is to provide an apparatus that allows to act independently on the reaction parameters, i.e. temperatures, permanence time of the material in the reactor, and weight ratio between the reagents.

With this aim in view, as well as these objects and others which will become apparent hereinafter, there is provided, according to the present invention, an apparatus for activating carbon-containing material, characterized in that it comprises: means for feeding the carbon-containing material to be activated into a drum-shaped reactor which is arranged so that its axis is substantially horizontal and has means for moving the material around and along its axis; heating means arranged outside said reactor; means for injecting a stream of superheated steam inside said reactor; and means for discharging the activated carbon-containing material outside said reactor.

BRIEF DESCRIPTION OF THE DRAWINGS

Further characteristics and advantages of the apparatus according to the present invention will become apparent from the following detailed description of a preferred but not exclusive embodiment thereof, illustrated only by way of non-limitative example in the accompanying drawings, wherein.

DESCRIPTION OF THE PREFERRED EMBODIMENTS

Figure 1:
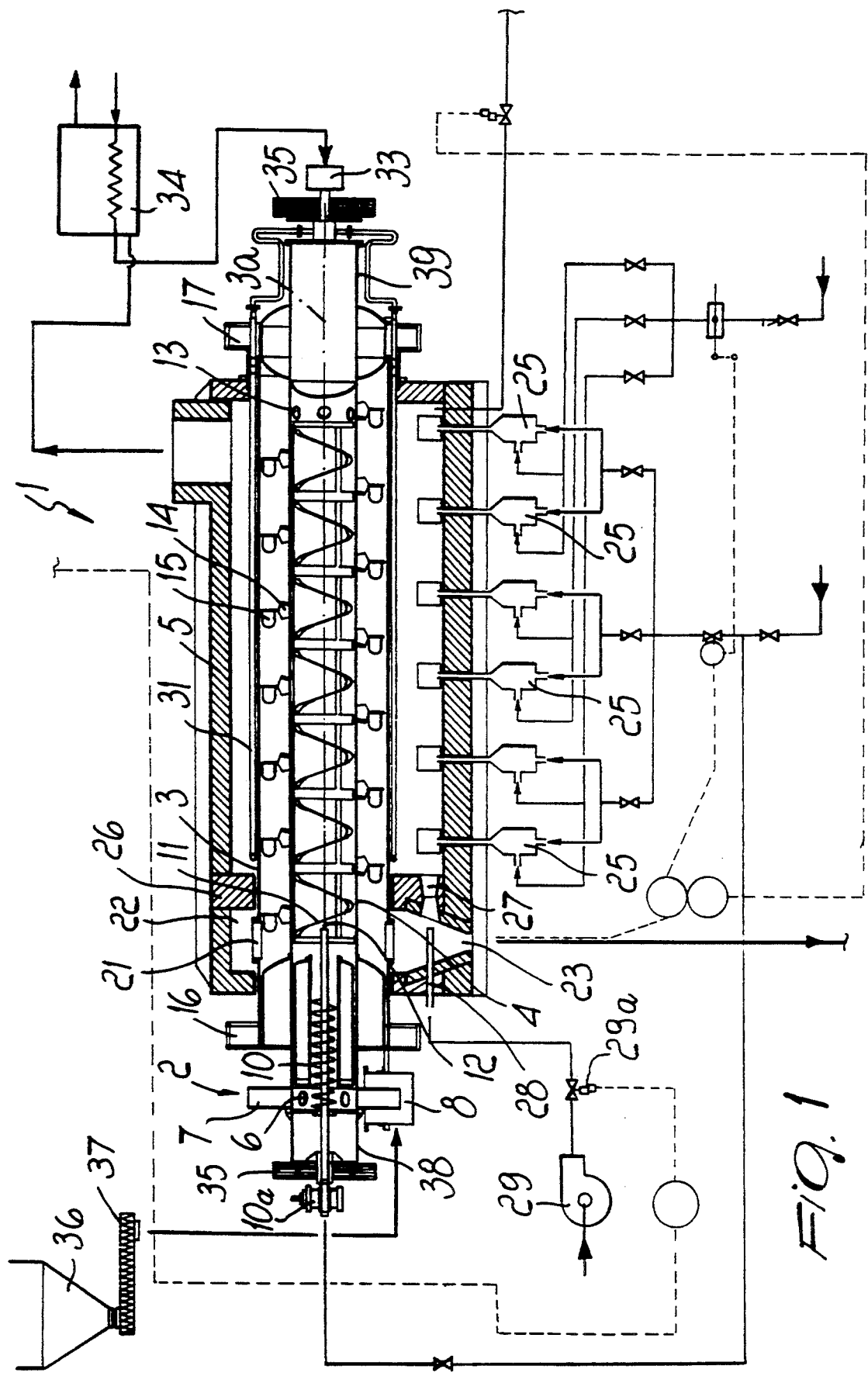
FIG. 1 is a schematic view of the apparatus according to the present invention.
Figure 2:
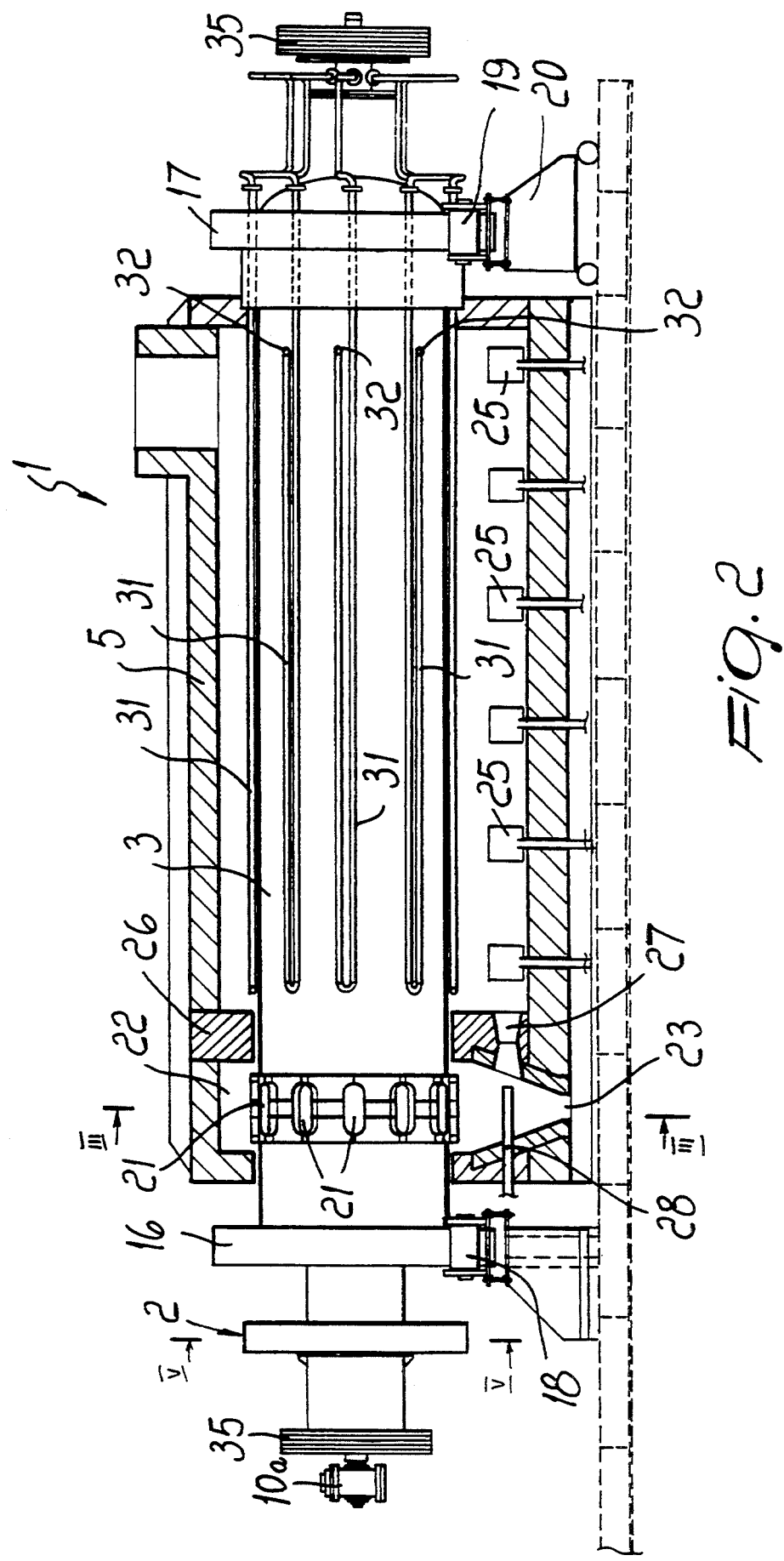
FIG. 2 is a schematic view of the drum-shaped reactor of the apparatus according to the invention and of the heating means.
Figure 3:
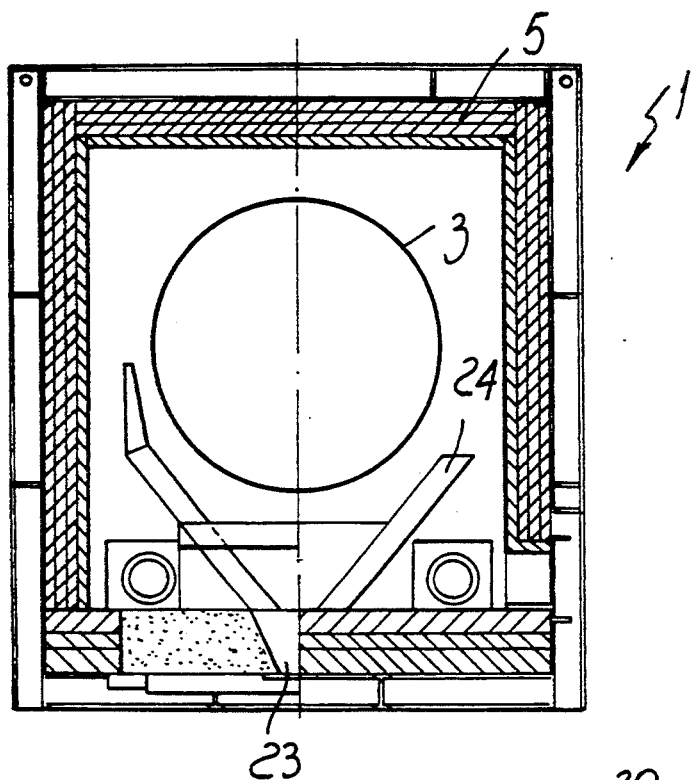
FIG. 3 is a schematic and enlarged-scale sectional view of FIG. 2, taken along the plane III—III.

With reference to the above figures, the apparatus according to the present invention, generally designated by the reference numeral 1, comprises means 2 for feeding the carbon-containing material to be activated into a drum-shaped reactor 3 which is arranged so that its axis is substantially horizontal and has means for moving the carbon-containing material around and along its axis 3a. The apparatus comprises heating means which are arranged outside the drum-shaped reactor 3, means for injecting a stream of superheated steam inside the reactor 3, and means for discharging the activated carbon-containing material outside the drum-shaped reactor 3.

The apparatus according to the present invention also advantageously comprises means for preheating the carbon-containing material to be activated before introducing it in the reactor 3.

Conveniently, the means for preheating the carbon-containing material to be activated are constituted by a preheating drum 4 which is arranged coaxially inside the drum-shaped reactor 3.

The preheating drum 4 and the reactor 3 are rigidly coupled together in their rotation about the common axis 3a, are rotatably supported about said axis 3a, and are partially accommodated inside a heating muffle 5.

The axial ends 16, 17 of the drum-shaped reactor 3 protrude from the heating muffle 5, and the axial ends 38, 39 of the preheating drum 4 protrude from the axial ends of the reactor 3. Loading ports 6 are formed in the skirt of one of the end regions of the preheating drum 4 that protrude from the reactor 3 and are distributed around the axis 3a; the carbon-containing material to be processed passes through said ports and is introduced in the preheating drum 4.

Figure 5:
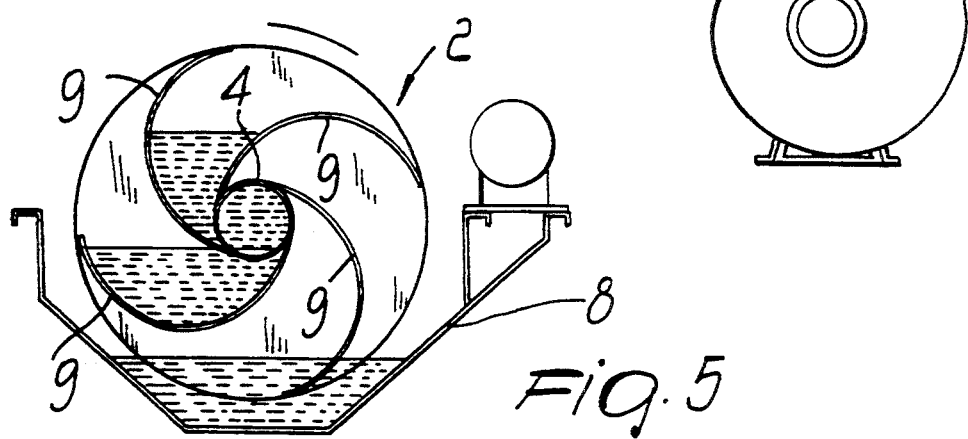
FIG. 5 is a schematic sectional view of FIG. 2, taken along the plane V—V.

The means for introducing the carbon-containing material in the preheating drum 4 are preferably constituted by a wheel 7 which is fixed coaxially around the preheating drum 4 at the loading ports 6. Said wheel 7 is partially immersed, with its lower portion, inside a tank 8 for the carbon-containing material to be processed and, as shown in greater detail in FIG. 5, has a plurality of vanes 9 extending along substantially spiral-shaped paths that converge towards the preheating drum 4, so that by rotating the reactor 3 and the preheating drum 4 about the axis 3a, the vanes 9 pick up the carbon-containing material that is present in the tank 8 and lift it, conveying it by gravity to the loading ports 6 of the preheating drum 4.

A screw feeder 10 is accommodated in the portion of the preheating drum 4 that lies between the loading ports 6 and the muffle 5; said screw feeder is arranged coaxially with respect to the preheating drum 4 and is driven by means of an appropriate variable-speed motor 10a arranged outside the preheating drum 4, so as to cause the advancement of the carbon-containing material introduced in the first portion of the preheating drum 4.

Means for moving the carbon-containing material around and along the axis 3a are provided inside the preheating drum 4. Said movement means are appropriately constituted by a continuous or discontinuous cylindrical helix 11 which is fixed to the internal surface of the preheating drum 4.

Inside the preheating drum 4 there are also means for heating the carbon-containing material that has been introduced; said means are advantageously constituted by a burner 12 which is arranged at the axis 3a and is supplied through a duct that passes coaxially through the shaft of the screw feeder 10.

Discharge ports 13 are formed proximate to the opposite end of the preheating drum 4, in any case still inside the muffle 5, and connect the preheating drum 4 to the inside of the reactor 3.

Means for moving the carbon-containing material around and along the axis of the reactor are provided inside the reactor 3 as well.

In practice, the reactor 3 is constituted by a chamber that has an annular cross-section and runs around the preheating drum 4, and the means for moving the carbon-containing material are constituted by vanes 14 which are arranged so as to form a continuous or discontinuous cylindrical helix and are fixed to the outer surface of the preheating drum 4. Advantageously there are also auxiliary vanes 15 which are fixed to said vanes 14.

On the outside of the muffle 5 there are means for rotating the reactor 3 of the preheating drum 4 at variable speed about the axis 3a. More particularly, the drum-shaped reactor 3 has, at its axial ends, regions 16 and 17 having an increased diameter which rest on motorized rollers 18 and on idler rollers 19. The rollers 18 are rotated about their axis, for example by means of variable-displacement hydraulic motors, and rotate the drum-shaped reactor 3 by direct contact. The idler rollers 19 are appropriately mounted on a carriage 20 that can slide parallel to the axis 3a so as to compensate for the axial elongations of the drum-shaped reactor 3 caused by its heating.

The drum-shaped reactor 3 has, in a side wall region proximate to its axial end which lies opposite to the end proximate to which the ports 13 for discharge into the preheating drum 4 are arranged, discharge ports 21 through which the activated carbon-containing material and the reaction gases are removed from the drum-shaped reactor 3. More particularly, the discharge ports 21 are formed inside the heating muffle 5 in a chamber 22 which is separated from the region of the muffle in which the means for heating the drum-shaped reactor 3 are located. The chamber 22 where the gas separates from the activated charcoal is provided, in a downward region, with a port 23, and a hopper 24 for collecting the material delivered by the reactor 3 is provided at said port 23.

The means for heating the drum-shaped reactor 3 are constituted by a plurality of burners 25 which are arranged inside the heating muffle 5 in a region which, as mentioned, is separated by means of a partition 26 from the chamber 22 in which the processed material is discharged.

Conveniently, the gases produced by the reaction of the activation of the carbon-containing material are also used to heat the reactor 3. The chamber 22 is in fact connected to the region of the muffle that accommodates the burners 25 through passages 27 which are shaped like an ejector body i.e. having a convergent portion followed by a divergent portion; a comburent gas, i.e. a gas that supports combustion, such as for example air or oxygen, is injected through said passages 27.

Figure 4:
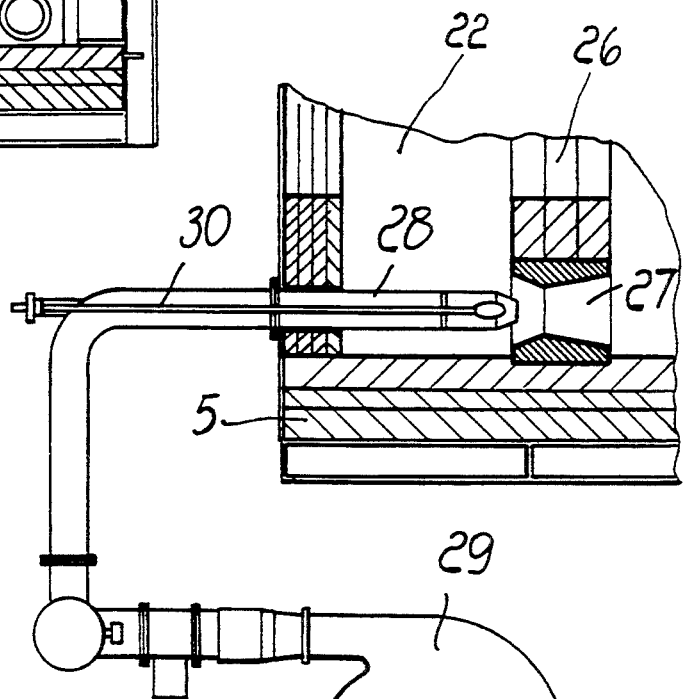
FIG. 4 is a view of a detail of the heating means of the drum-shaped reactor.

As illustrated in particular in FIG. 4, coaxially to the passages 27 there is a nozzle 28 which is supplied with the comburent gas by an impeller 29. The aperture of the nozzle 28, and therefore the flow-rate of the comburent gas, as well as its pressure, are adjustable in a per se known manner, for example by means of a threaded rod 30 and an adjustment valve 29a, from the outside of the heating muffle 5. In practice, the passages 27 and the nozzles 28 form true ejectors that extract the gases produced by the activation reaction from the reactor 3 and feed them into the heating muffle 5, burning them.

The means for injecting the stream of superheated steam inside the reactor 3 are constituted by a plurality of ducts 31 which are connected to the outer surface of the drum-shaped reactor 3 and end in the drum-shaped reactor 3 through holes 32 formed in a side wall portion defining a skirt of the reactor 3 proximate to the discharge ports 13 of the preheating drum 4 so that the carbon-containing material, during its advancement inside the reactor from the ports 13 toward the discharge port 21, is struck by the stream of steam flowing in the same direction. The ducts 31, which are appropriately shaped to compensate for thermal expansions, are connected to a rotating coupling 33 which is mounted on the end of the preheating drum 4 which is opposite to the end where the carbon-containing material is loaded. The rotating coupling 33 is connected to a steam generator 34 which can be heated by means of the fumes that leave the heating muffle 5, which have an enthalpic content that is sufficient to ensure the production of the amount of steam required for the activation process.

Advantageously, to prevent the assembly constituted by the reactor 3 and by the preheating drum 4 from undergoing excessive flexural deformations due to the high temperatures of the process, the axial ends of the preheating drum 4 are appropriately pre-loaded with weights 35.

For the sake of completeness in description, it should be noted that the carbon-containing material to be processed is conveyed to the tank 8 by virtue of known means, such as for example a loading hopper 36 assisted by a screw feeder 37, whereas the activated carbon-containing material is removed from the port 23 and subjected to cooling cycles in a per se known manner.

The operation of the apparatus according to the present invention is as follows.

Due to the combined action of the rotary motion of the preheating drum and of the presence of the helix 11, the carbon-containing material introduced in the preheating drum 4 advances along said preheating drum 4 up to the discharge ports 13, thus preheating. It should be noted that the preheating of the material inside the preheating drum 4 occurs directly.

Through the ports 13, the preheated carbon-containing material passes into the drum-shaped reactor 3, where it makes contact with the superheated steam and gradually advances inside the reactor 3 in the opposite direction with respect to the direction followed inside the preheating drum 4. The vanes 14 and 15 control the advancement of the carbon-containing material during the activation reaction, and at the same time their shape stirs the material, forcing the steam to pass, during its motion, through the bed of carbon-containing material, thus striking it directly. In this manner the steam is prevented from flowing only over the surface of the bed of material arranged on the bottom of the reactor, facilitating contact between the reacting phases. In particular, the vanes 15, by virtue of the rotation of the reactor 3, lift the carbon-containing material and then let it fall, helping to constantly renew the surface of the layer of carbon-containing material that is in contact with the steam and thus further improving the effectiveness of the gas-solid exchange. A temperature substantially comprised between 675° C. and 1100° C. is maintained inside the reactor 3, and the activation reaction occurs substantially at atmospheric pressure.

At the end of the path inside the reactor 3, the reaction products, together with the excess steam, leave the reactor 3 through the ports 21. Since the reaction gases are constituted by combustible products, $H_2$ and $CO$, they are introduced in the combustion chamber of the muffle 5 through the passages-ejectors 27 and are burned, providing the heat required to sustain the endothermic activation reaction. In practice, the operating conditions of reheating occur inside the muffle 5. In practice, the burners 25 act as pilot burners and are activated only during startup and to adjust the reaction temperature, which is maintained, as mentioned, preferably between 675° C. and 1100° C.

The burned gases generated in the combustion chamber of the muffle 5 leave the muffle 5 with a still high enthalpic content that is used in the boiler 34 to generate the steam required for the process. The steam that leaves the boiler 34 is saturated and enters the reactor 3 after flowing inside the ducts 31, along which the steam is superheated.

In practice it has been observed that the apparatus and the process according to the present invention fully achieve the intended aim and objects, since they allow to achieve high yields with low investment and running costs with respect to conventional processes and apparatuses. Furthermore, by indirectly heating the carbon-containing material during the reaction it is possible to work with low specific consumptions of charcoal according to the final characteristics to be given to the product.

An additional advantage resides in the high efficiency obtained by the particular reactor, which is furthermore structurally very compact and constructively relatively simple.

The apparatus and the process thus conceived are susceptible to numerous modifications and variations, all of which are within the scope of the inventive concept; all the details may furthermore be replaced with other technically equivalent elements.

In practice, the materials employed, as well as the dimensions, may be any according to the requirements and the state of the art.

We claim:

1. Apparatus for activating carbon-containing material by an activation reaction, comprising:
    a heating muffle
    a drum-shaped reactor partially accommodated inside the muffle and defining a reactor axis, the reactor being arranged so that the reactor axis is substantially horizontal
    means for feeding the carbon-containing material to be activated in the reactor
    means for moving the material around and along the reactor axis
    heating means arranged inside the muffle, between the muffle and the reactor
    means for injecting a stream of superheated steam inside the reactor
    means for discharging activated carbon-containing material outside the reactor
    means for preheating the carbon-containing material prior to its introduction in the reactor, the preheating means comprising a preheating drum arranged coaxially with and inside the reactor, the preheating drum being provided with at least one loading port, the at least one loading port being arranged proximate to a first axial end of the preheating drum that protrudes from a first axial end of the reactor, the preheating drum being further provided with at least one discharge port, the at least one discharge port being formed proximate to a second axial end of the reactor opposite to first end of the reactor.

2. Apparatus according to claim 1, wherein said preheating means comprise a burner which is arranged inside said preheating drum.

3. Apparatus according to claim 1, wherein the means for moving the carbon-containing material around and along the reactor axis are arranged inside the preheating drum for the advancement of said carbon-containing material from said loading port toward said discharge port.

4. Apparatus according to claim 1, wherein said means for moving the carbon-containing material in said preheating drum are constituted by at least one cylinder helix which is fixed to the internal surface of said preheating drum, means being provided for driving said preheating drum so that it rotates about its own axis.

5. Apparatus according to claim 1, wherein said means for moving the carbon-containing material inside said reactor comprise vanes which are arranged so as to substantially form a cylindrical helix and are fixed to the outer surface of said preheating drum.

6. Apparatus according to claim 1, wherein said means for moving the carbon-containing material inside said reactor comprise stirring vanes which are associated with the outer surface of said preheating drum.

7. Apparatus according to claim 1, wherein said reactor and said preheating drum are mutually coupled to rotate in the same time about their common axis and are rotatably supported about said common axis inside the heating muffle, said preheating drum and said reactor protruding with their axial ends from said muffle.

8. Apparatus according to claim 7, wherein said heating means comprise burners which are arranged outside said drum-shaped reactor inside said muffle.

9. Apparatus according to claim 7, wherein said heating means comprise burners which are arranged inside said muffle and are supplied with gases produced by the activation reaction of the carbon-containing material inside said reactor.

10. Apparatus according to claim 7, further comprising means for extracting gases produced by the activation reaction from said reactor and means for introducing said gases in said muffle.

11. Apparatus according to claim 9, wherein said reactor has at least one discharge port formed in a side wall region of the reactor proximate to its first axial end inside said muffle in a chamber which is separated from a region that accommodates said burners, said chamber having, in a downward region, a port for discharging the activated carbon-containing material and being connected to the region that accommodates said burners through at least one passage having a convergent portion followed by a divergent portion, said extraction means and said introduction means being constituted by said passage and by means for injecting comburent gas through said passage entering the region of the muffle that accommodates said burners.

12. Apparatus according to claim 11, wherein said means for introducing a stream of steam into said reactor comprise conveyance ducts which are connected to a source of steam and run at least partially in contact with an outer surface of said reactor inside said muffle.

13. Apparatus according to claim 12, wherein said steam conveyance ducts are connected to the outer surface of said reactor and lead into said reactor through holes formed in a side wall region of said reactor proximate to its second axial end, said conveyance ducts being supplied through a rotating coupling which is coaxially associated with the axial end of said preheating drum that is opposite to the side for introducing the material to be processed.

14. Apparatus according to claims 7, wherein said means for feeding the material to be activated comprise a loading wheel which is keyed coaxially around said preheating drum at said loading port outside said muffle, said loading wheel drawing from a tank for containing the material to be activated and being provided with spiral-shaped vanes that converge towards said loading port to remove the material from said tank and convey it towards said loading port when said preheating drum is rotated about its own axis.

15. Apparatus according to claim 7, wherein one of the axial ends of said reactor rests, outside said muffle, on driver rollers that actuate said reactor and said preheating drum so that they rotate about their common axis, the other axial end of said reactor resting on idler rollers.

16. Apparatus according to claim 15, wherein said idler rollers that support said reactor at said other axial end are mounted on a carriage that is movable parallel to the axis of said reactor.

17. Apparatus according to claim 1, further comprising weights at axial ends of the preheating drum that protrude from said drum-shaped reactor.

* * * * *